3,004,950
COPOLYMERS OF CERTAIN ORGANOSILICON MONOMERS AND N-VINYL CYCLIC CARBAMATES

William F. Tousignant and Wilhelm E. Walles, Midland, Mich., assignors to The Dow Chemical Company, Midland, Mich., a corporation of Delaware
No Drawing. Filed Dec. 5, 1958, Ser. No. 778,296
8 Claims. (Cl. 260—46.5)

The present invention resides in the general field of chemistry and, more precisely, contributes to the art of manmade, synthetic polymers. More particularly, this invention is directed to copolymers of certain monovinyl organosilicon monomer compositions and certain N-vinyl cyclic carbamates, as hereinafter more fully delineated, as new compositions of matter.

It is the chief aim and primary design of the present invention to provide and make available new and useful copolymers of the indicated variety that, among other uses and characterizing qualities, may be employed with particular advantage and significant benefit as emulsifying agents for silicone oil/water emulsions.

All of the foregoing and yet additional and ancillary advantages and features of the invention will become apparent from a study of the following description and specification.

To the attainment of the indicated ends, thermally stable, silicon-containing copolymers in accordance with the present invention that are soluble in water and in various liquid organic compounds are of the general structure:

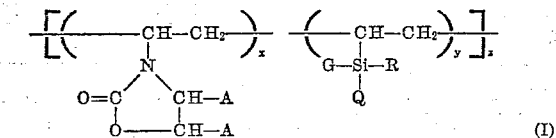

in which, on a weight basis, $z$ is equal to the sum of $x$ plus $y$ and the value of either $x$ or $y$ (and their relative proportion) is such that at least about one (1) weight percent of the copolymer consists of either the polymerized monovinyl organosilicon compound or the N-vinyl cyclic carbamate; each A is independently selected from the group consisting of hydrogen and methyl with the limitation that not more than a single A can be methyl and not more than a single A can be hydrogen; and G, Q and R are each independently selected from the group consisting of hydrogen, hydroxy, lower alkyl, and alkoxy groups containing from 1 to about 4 carbon atoms and self-repetitious

groups in which each G, Q and R substituent is independently as herein defined with the limitation that not more than about seven (7) interconnected silicon atoms can be present in each recurring unit of the monovinyl organic silicone compound in the copolymer structure. Of course, mixtures of various N-vinyl cyclic carbamates and mixtures of the organic silicone monomers can be utilized in the copolymers of the present invention.

As is apparent, the N-vinyl cyclic carbamates used in the practice of the present invention are selected from the group consisting of N-vinyl-5-methyl-2-oxazolidinone, N-vinyl-4-methyl oxazolidinone and their mixtures. For the sake of brevity and convenience, the first-mentioned N-vinyl cyclic carbamate will hereinafter be referred to as VO-M.

Among the monovinyl silicon monomers that can be utilized with particular advantage are triethoxy vinyl silane and tris(trimethyl-siloxy)-vinyl silane.

Surprising as it may seem, the class of silicon monomers that have a halogen attached directly to the silicon atom cannot be utilized for preparation of the present copolymers since, upon polymerization, they form hydrohalic acids that tend to attack and destroy the oxazolidinone constituent being employed.

As little as one (1) weight percent or so of either of the indicated comonomers in the copolymer product (particularly the oxazolidinone monomer) has a marked effect on the emulsifying ability of the copolymer product in use with silicone oil/water emulsions. More highly pronounced effects are noted when the content of either comonomer is between about 5–10 and 90–95 weight percent, based on the weight of the polymer product. Advantageously, for many purposes (particularly for use as emulsifiers in silicone oil/water systems), about equal weight proportions of the N-vinyl cyclic carbamate and the monovinyl organosilicon monomeric composition are polymerized together in the copolymer molecule so that, for example, between about 40 and 60 weight percent of polymerized N-vinyl cyclic carbamate (or monovinyl silicone compound) is present in the copolymeric product.

The copolymers of the present invention are normally solid (i.e., under atmospheric pressure and at conventional room temperatures) materials that have very high melting points. Frequently, for example, the copolymeric products have melting points in excess of about 300° C. The copolymers may advantageously be prepared as high polymers having molecular weights, for example, in the range from 5 or 10 to several hundred thousand (as determinable from Fikentscher K-values of about 5–10 or more to as high as 75 to 100 or so).

Several suitable techniques are available for preparation of the presently contemplated copolymer products. Advantageously, they are prepared by polymerization in solution at temperatures between about 50° C. and about 100° C. using $\alpha,\alpha'$-azobisisobutyronitrile (or its equivalents) as a polymerization catalyst.

The invention is further illustrated in and by the following exemplifications, wherein all parts and percentages are on a weight basis.

Illustration "A"

Into a polymerization kettle equipped with a water condenser, stirrer, thermometer and nitrogen sparger there was charged about 31.7 grams (0.25 mole) of VO-M and about 43.8 grams (0.25 mole) triethoxy vinyl silane along with about 150 cubic centimeters of absolute ethanol (denatured with benzene) as a solvent. About 1.5 grams of $\alpha,\alpha'$-azobisisobutyronitrile (2 percent based on charged monomers) was then added as a catalyst. The reaction mass was heated at 80° C. under nitrogen for ten (10) hours, after which the reaction was terminated. Upon removal of solvent, about 44.0 grams of an orange, jelly-like polymer product was recovered. This represented a conversion of monomers of about 58 percent.

The gel was blended with a mixture of methylene chloride and water, using a Waring Blendor for the purpose. After blending, a spongy solid remained. This was separated by vacuum filtration and dried. A light tan solid copolymer resulted.

An analysis of the copolymer demonstrated it to contain about 5.01 percent nitrogen and about 8.74 percent silicon. Thus, its composition based on percent nitrogen was 45.5 percent VO-M/54.5 percent triethoxy vinyl silane. Based on percent silicon, its composition was 45.3 percent VO-M/54.7 percent triethoxy vinyl silane.

The copolymer, which was wettable with water, did not melt at temperatures beneath 300° C.

*Illustration "B"*

The general procedure of the first illustration was followed excepting to employ 95.1 grams (0.75 mole) of VO–M; 43.8 grams (0.25 mole) of triethoxy vinyl silane; 2.7 grams of the same catalyst; 275 cubic centimeters of the same solvent; and to heat the reaction mass for the same period of time at 75° C. After termination of the reaction and upon removal of the solvent, about 73.3 grams (53 percent conversion) of tan solid was recovered.

The resulting solid tan crude copolymer was dissolved in methylene dichloride and then precipitated out with a 50/50 mixture of isopropanol/ether solution. Repetition of the precipitation and subsequent drying gave a light tan, purified copolymer product. Its nitrogen content, upon analysis, was found to be about 7.30 percent. It contained about 4.47 percent of silicon. Its composition, based on percent nitrogen, was: 66.3 percent VO–M/33.8 percent triethoxy vinyl silane. Based on percent silicon it was: 72.0 percent VO–M/28.0 percent triethoxy vinyl silane.

The copolymer decomposed at a temperature of about 275° C. It was soluble in acetone and partly soluble in water. Its K-value (in acetone) was about 16.1.

*Illustration "C"*

Into a polymerization kettle equipped with a water condenser, stirrer, thermometer and dropping funnel there was charged about 200 cubic centimeters of absolute ethanol (denatured with benzene). The alcoholic solvent was then heated to about 75° C. and maintained at this temperature. To the alcoholic solvent, with continued stirring, there was then added dropwise through the dropping funnel a mixture of two monomers, catalyst and additional solvent consisting of: 10.0 grams (0.03 mole) of tris (trimethyl siloxy) vinyl silane, 90.0 grams (0.70 mole) of VO–M, 1.5 grams of α,α'-azobisisobutyronitrile and 50.0 cubic centimeters of the absolute ethanol (to give a homogeneous mixture). The polymerization was conducted for about seven (7) hours at the indicated temperature (75° C.).

The resulting copolymer in crude form was soluble in hot ethanol. Upon cooling, the copolymer precipitated out of the hot alcohol solution and was filtered off. The precipitate was then dissolved in methylene dichloride and again precipitated from diethyl ether, giving a white powder copolymer product upon vacuum drying.

Recovery of the copolymer was about 86 percent. It contained 9.53 percent nitrogen and consisted of about 86.5 percent of the VO–M copolymerized with the silicon monomer.

The copolymer product was soluble in hot ethanol, acetone and methylene dichloride. Its water-solubility was very slight.

*Illustration "D"*

A solution containing 90 percent of dimethylpolysiloxane oil and 10 percent of the copolymer product of Illustration "B" was prepared. The oil had a viscosity (at room temperature) of about 350 centistokes and was entirely miscible with the copolymer. Water was slowly added to this solution until inversion occurred. An oil-in-water emulsion was thereby obtained.

Similar results are obtained when the foregoing is repeated with other of the copolymer products of the invention falling within the scope of Formula I, as when N-vinyl-4-methyl-2-oxazolidinone, or mixtures thereof with VO–M, are employed in the preparation of the copolymers or when other of the monomeric monovinyl organosilicon compositions within the scope and purview of the invention are utilized for the polymer products.

Those skilled in the art will appreciate that many modifications falling within the hereto appended claims can be entered into in the practice of the present invention without departing from the comprehension and spirit thereof.

What is claimed is:

1. A copolymer consisting essentially of (a) between about 1 and about 99 weight percent, based on the weight of the copolymer, of a polymerized N-vinyl cyclic carbamate monomer selected from the group consisting of N-vinyl-5-methyl-2-oxazolidinone, N-vinyl-4-methyl-2-oxazolidinone and mixtures thereof; and (b) between about 99 and about 1 weight percent, based on the weight of the copolymer, of a polymerized monovinyl organosilicon monomer composition of the structure:

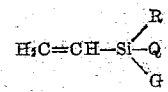

wherein G, Q and R are each independently selected from the group consisting of hydrogen, hydroxy, lower alkyl, and alkoxy groups containing from 1 to 4 carbon atoms and

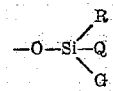

units in which each G, Q and R are independently as above defined with the limitation that at least one silicon atom is present but not more than 7 interconnected silicon atoms are present in each molecule of said monovinyl organosilicon composition.

2. The copolymer of claim 1, containing from about 5 to about 95 weight percent of said N-vinyl cyclic carbamate.

3. The copolymer of claim 1, containing about equal weight proportions of said constituents (a) and (b).

4. The copolymer of claim 1, wherein said N-vinyl cyclic carbamate is N-vinyl-5-methyl-2-oxazolidinone.

5. The copolymer of claim 1, wherein said monovinyl organosilicon composition is triethoxy vinyl silane.

6. The copolymer of claim 1, wherein said monovinyl organosilicon composition is tris (trimethyl-siloxy)-vinyl silane.

7. The copolymer of claim 1, wherein said N-vinyl-5-methyl-2-oxazolidinone and said monovinyl organosilicon composition is triethoxy vinyl silane.

8. The copolymer of claim 1, wherein said N-vinyl-5-methyl-2-oxazolidinone and said monovinyl organosilicon composition is tris (trimethyl-siloxy)-vinyl silane.

References Cited in the file of this patent

UNITED STATES PATENTS

| | | |
|---|---|---|
| 2,532,583 | Tyran | Dec. 5, 1950 |
| 2,818,362 | Drechsel | Dec. 31, 1957 |
| 2,820,798 | Bailey et al. | Jan. 21, 1958 |
| 2,891,058 | Walles et al. | June 16, 1959 |
| 2,919,279 | Walles et al. | Dec. 29, 1959 |